Feb. 14, 1939. E. J. CZERWIN 2,146,942
AIR COOLED TIRE
Filed July 21, 1937

Inventor

E. J. Czerwin

By Clarence A. O'Brien
Hyman Berman
Attorneys

Patented Feb. 14, 1939

2,146,942

UNITED STATES PATENT OFFICE 2,146,942

AIR-COOLED TIRE

Edmund J. Czerwin, Newark, N. J.

Application July 21, 1937, Serial No. 154,882

1 Claim. (Cl. 152—153)

This invention relates to an air cooled tire, the general object of the invention being to provide the side walls of the tire with spaced radiating grooves which form ribs between them and these grooves and ribs enable the air currents striking the side walls of the tire to cool the entire tire and act to prevent internal heat which is produced by high speeds and which often result in blow-outs.

This invention also consists in certain other features of construction and in the combination and arrangement of several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1:
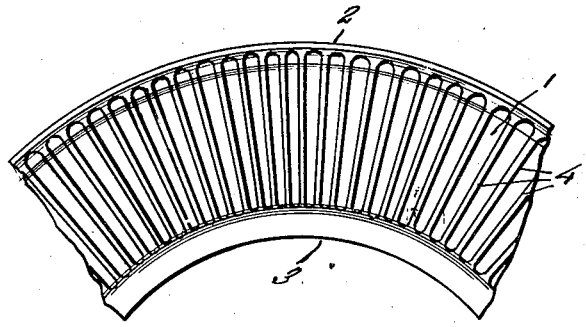
Figure 1 is a fragmentary side view of a tire constructed in accordance with this invention.
Figure 2:
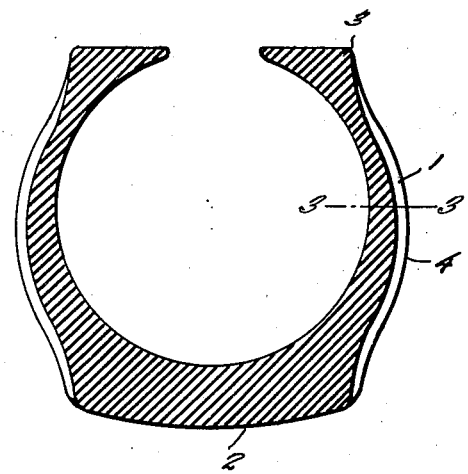
Figure 2 is a transverse sectional view through the tire.
Figure 3:
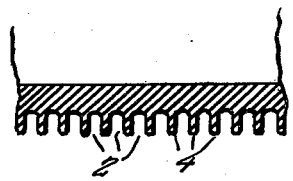
Figure 3 is a section on the line 3—3 of Figure 2.

As shown in this drawing each side wall of the tire is provided with a plurality of radiating grooves 1 which extend from the edge of the tread 2 to a point slightly spaced from the inner edge of the bead 3 of the tire. Each groove gradually increases in width from its inner end to its outer end and said grooves form ribs 4 between them, said ribs being of substantially the same width from end to end but they decrease in depth as they approach the tread and bead.

This formation of the side walls of the tire produces the maximum amount of surface to be acted on by the air so that the tire is kept cool and internal heat is prevented from occurring in the tire and tube, which often causes blowouts, particularly when the vehicle is traveling at high speed.

By making the grooves gradually increase in width from the inner ends to the outer ends any dirt or mud collecting in said grooves will be thrown off by centrifugal force so that said grooves will remain free of dirt and other foreign matter and thus the walls of the grooves as well as the ribs will be acted upon by the air currents. As will be understood the faster the vehicle travels the more circulation of cooling air through the grooves and against the ribs or fins will result.

It is thought from the foregoing description that the advantages and novel features of the invention will be readily apparent.

It is to be understood that changes may be made in the construction and in the combination and arrangement of the several parts, provided that such changes fall within the scope of the appended claim.

Having described the invention what is claimed as new is:—

An automobile tire comprising beads, side walls and a tread, the side walls being provided throughout the same with transverse ribs extending from adjacent the beads to the edges of the tread, said ribs being radially disposed, equidistantly spaced and of uniform width to form therebetween air cooling pockets gradually increasing in width outwardly and opening at the outer ends thereof to facilitate discharge of dirt therefrom under centrifugal force, said ribs decreasing in depth toward both ends thereof to render the air pockets shallower at both ends and thereby further facilitate discharge of dirt from said pockets.

EDMUND J. CZERWIN.